(12) United States Patent
Miyata

(10) Patent No.: US 6,486,796 B2
(45) Date of Patent: Nov. 26, 2002

(54) RELATIVE-DISPLACEMENT DETECTING UNIT

(75) Inventor: Toshiharu Miyata, Kawasaki (JP)

(73) Assignee: Mitutoyo Corporation, Kawasaki (JP)

( * ) Notice: Subject to any disclaimer, the term of this patent is extended or adjusted under 35 U.S.C. 154(b) by 0 days.

(21) Appl. No.: 09/903,246

(22) Filed: Jul. 11, 2001

(65) Prior Publication Data

US 2002/0005726 A1 Jan. 17, 2002

(30) Foreign Application Priority Data

Jul. 13, 2000 (JP) ......................................... 2000-213210

(51) Int. Cl.[7] .............................................. G08C 19/06
(52) U.S. Cl. ........................... 340/870.32; 340/870.31; 324/207.17
(58) Field of Search .......................... 340/686.1, 686.2, 340/686.4, 686.6, 517, 518, 521, 524, 870.32, 870.31, 870.33; 324/207.17, 207.24, 226, 230; 336/131, 45; 310/12

(56) References Cited

U.S. PATENT DOCUMENTS

| | | | |
|---|---|---|---|
| 4,513,257 A | | 4/1985 | Miyamoto et al. |
| 4,851,770 A | * | 7/1989 | Fiori, Jr. ................. 340/870.31 |
| 5,010,298 A | * | 4/1991 | Uemura .................. 324/207.19 |
| 6,054,851 A | * | 4/2000 | Masreliez et al. ...... 324/207.17 |
| 6,160,349 A | * | 12/2000 | Nagai ............................ 315/85 |
| 6,175,232 B1 | | 1/2001 | Coulon et al. |
| 6,333,572 B1 | * | 12/2001 | Ono .............................. 310/12 |

FOREIGN PATENT DOCUMENTS

| | | |
|---|---|---|
| EP | 0 821 216 A2 | 1/1998 |
| EP | 0 871 012 A1 | 10/1998 |

\* cited by examiner

Primary Examiner—Van Trieu
(74) Attorney, Agent, or Firm—Rankin, Hill, Porter & Clark LLP

(57) ABSTRACT

A detect ion unit 10, which is disposed in opposite relation to a scale 12, includes a transmission coil 10*a* and a detection coil 10*b*. A metal film 10*g* formed of two opposing metal films is provided between a silicon substrate and the transmission coil 10*a*, one of the two metal films is connected to a drive circuit 10*c*, and the other is connected to the transmission coil 10*a*. The metal film 10*g* provides the capacitance C of an LC resonance circuit, so that a chip capacitor is made unnecessary. The metal film 10*g* may be formed of a magnetic material.

9 Claims, 4 Drawing Sheets

RELATIVE-DISPLACEMENT DETECTING UNIT

BACKGROUND OF THE INVENTION

1. Field of the Invention

The present invention relates to a relative-displacement detecting unit, and more particularly to the miniaturization of the relative-displacement detecting unit.

2. Description of the Related Art

In related art, a transducer or an encoder for detecting relative displacement is known. In a capacitance-type encoder, a transmission electrode and a reception electrode are provided on a grid (unit), and a signal electrode is provided on a scale opposing this unit. The transmission electrode and the reception electrode on the unit are capacity-coupled with the signal electrode on the scale. A drive signal is supplied to the transmission electrode, and a detection signal occurring in the reception electrode is processed by a processing circuit in correspondence with the relative position of the unit and the scale. Thus it is possible to detect the movement or the position of the unit with respect to the scale.

Meanwhile, in an induction-type encoder, the relative position is detected on the basis of the electromagnetic interaction (electromagnetic induction) between the unit and the scale. Namely, a transmission coil and a detection coil are disposed on the unit, and a scale coil is formed on the scale. As the transmission coil on the unit is driven, a magnetic flux occurs, and an induced current is generated in the scale coil on the scale by electromagnetic induction. A magnetic flux is generated by the induced current generated in the scale coil, and an induced current (induced voltage) is generated in the detection coil on the unit by the magnetic flux. Since the induced voltage varies in correspondence with the relative position of the transmission coil and the scale coil, the relative position of the unit and the scale can be detected by detecting the induced voltage generated in the detection coil.

The driving of the transmission coil is effected by using an LC resonance circuit, and the capacitance C is generally realized by using a chip capacitor. Namely, the reduction of current consumption is attained by allowing a high-frequency large current to momentarily flow across the transmission coil by making use of the chip capacitor.

However, with the configuration in which the chip capacitor is provided to utilize the LC resonance circuit, there has been a problem in that it is difficult to miniaturize the unit due to this chip capacitor.

SUMMARY OF THE INVENTION

The invention has been devised in view of the above-described problem of the conventional art. It is an object to provide a unit which can be further miniaturized by realizing an LC circuit without using a chip capacitor.

The above-mentioned object can be achieved by a relative-displacement detecting unit for detecting a relative displacement of the relative-displacement detecting unit and a scale disposed opposing the relative-displacement detecting unit, and for outputting it as an electrical signal, according to the invention, comprising: a substrate; a transmitting section formed on the substrate; and a metal film formed between the substrate and the transmitting section so as to form a capacitor connected between the transmitting section and a circuit for driving the transmitting section. A metal film is formed between the substrate and the transmitting section, and this metal film forms the capacitance C of an LC resonance circuit for supplying a drive current to the transmitting section. In other words, a chip capacitor can be substituted for by the stray capacitance of a multilayered structure, thereby making it possible to make the unit compact. In addition, since the space for providing the chip capacitor is made unnecessary, the gap between the unit and the scale can be made small correspondingly, so that it is possible to improve the detection sensitivity.

In the above-mentioned relative-displacement detecting unit, it is preferable that the metal film is a magnetic film. By disposing the magnetic film between the substrate and the transmitting section, it is possible to increase a magnetic flux generated by the transmitting section, there by making it possible to increase the detection sensitivity.

Further, in the relative-displacement detecting unit, it is preferable that the metal film is formed of two metal films disposed in opposite relation to Leach other by being spaced apart a predetermined distance therebetween. By disposing two metal films in opposite relation to each other, a capacitor is formed which is determined by the gap between the two films, the area, and the dielectric constant between the metal films. The capacitance C necessary for the LC resonance circuit can be obtained by appropriately adjusting these physical quantities. It should be noted that in a case where a built-up substrate in which an insulator is laminated on the substrate is used, this insulator may be used as an insulator between the metal films of the capacitor.

Moreover, in the above-mentioned relative-displacement detecting unit, it is preferable that the metal film is formed so as to be spaced apart a predetermined distance from the transmitting section, and the capacitor is formed between the metal film and the transmitting section. Consequently, it is possible to further simplify the construction.

DETAILED DESCRIPTION OF THE INVENTION

Figure 1:
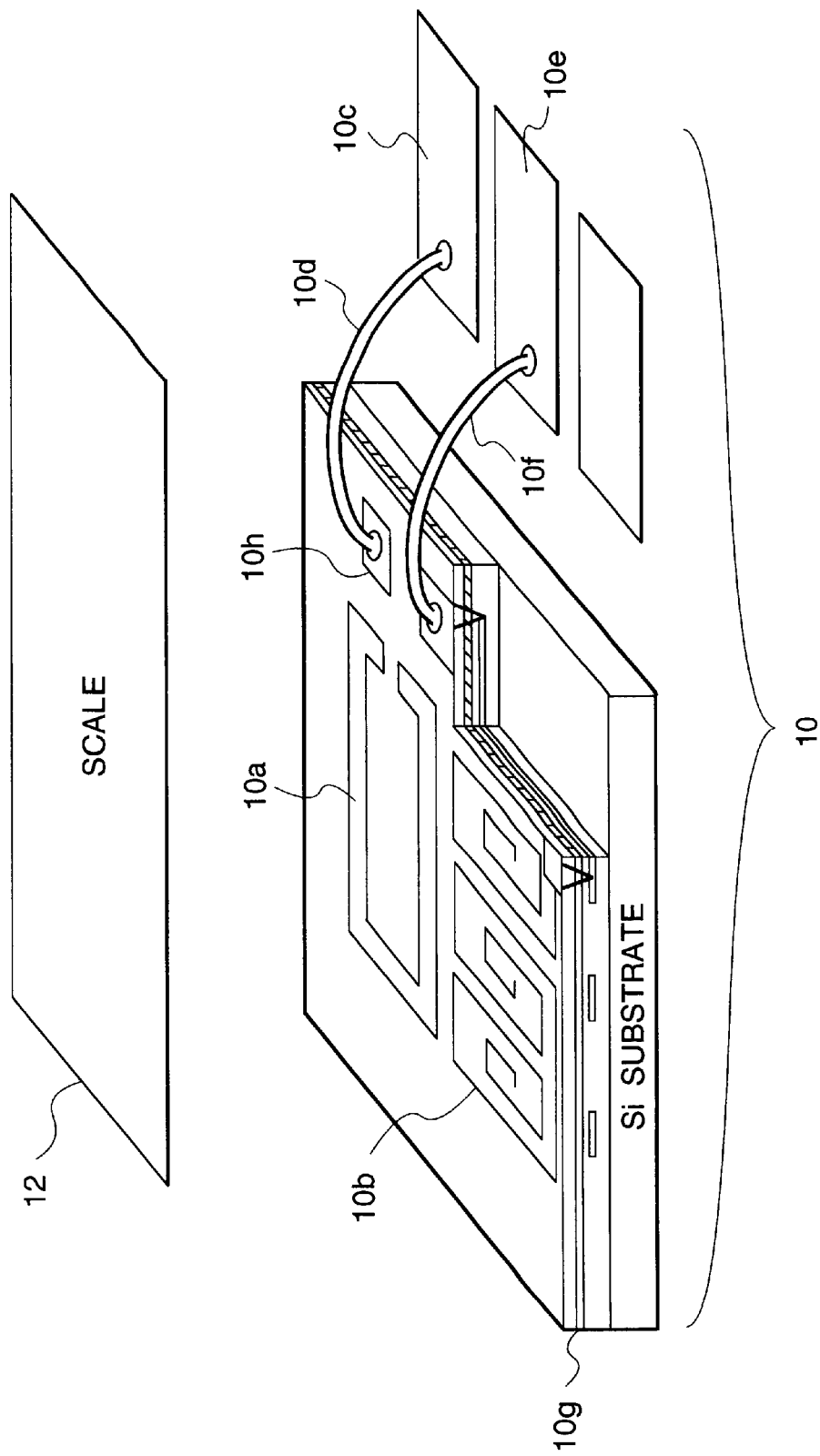
FIG. 1 is a schematic diagram of an induction-type encoder according a first embodiment of the invention.

Referring now to the drawings, a description will be given of the embodiments of the invention by citing an induction-type encoder (or a magnetic-type encoder) as an example.

FIG. 1 shows the configuration of an induction-type encoder according to a first embodiment of the invention. This induction-type encoder comprises a detection unit 10 and a scale 12 opposing the detection unit 10. The scale 12 includes a transmission coil 10*a* and a detection coil 10*b* formed on a silicon substrate. The transmission coil 10*a* is connected to a drive circuit 10*c* by means of a wire 10*d*. The detection coil 10b is connected by means of a wire 10f to a processing circuit 10e for detecting relative displacement by processing a detection signal. The detection coil 10b is formed by arraying a plurality of spiral coils (a spiral coil array) as in the illustrated case, so as to detect a magnetic flux caused by an induced current generated in the scale 12.

The transmission coil 10a and the detection coil 10b are formed on the same layer. Specifically, after a resin such as polyimide is built up on the silicon substrate as an insulator, and the transmission coil 10a and the detection coil 10b may be formed on the built-up substrate. A wiring layer for establishing contact between the transmission coil 10a and the wire 10d and a wiring layer for establishing contact between the detection coil 10b and the wire 10f are formed between the silicon substrate and the layer where the transmission coil 10a and the detection coil 10b are formed. A metal film 10g is further formed between the silicon substrate and the layer where the transmission coil 10a and the detection coil 10b. This metal film 10g is formed by disposing two metal films in opposite relation to each other, and is electrically disposed between a contact 10h of the wire 10d and the transmission coil 10a.

Figure 2:
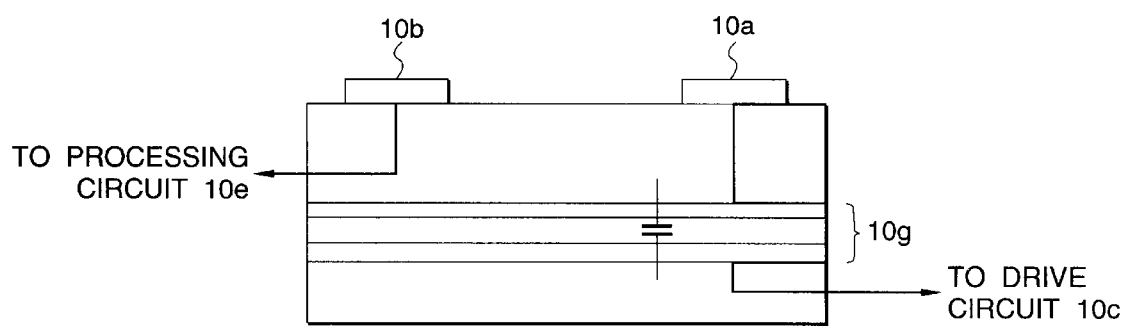
FIG. 2 is an explanatory diagram illustrating the relationship of connection between a metal film and a transmission coil shown in FIG. 1.

FIG. 2 schematically illustrates the relationships between the metal film 10g and the transmission coil 10a, and the metal film 10g and the detection coil 10b. The metal film log formed by disposing two metal films in opposite relation to each other is interposed between the silicon substrate and the transmission coil 10a, and is electrically provided on the wiring for connecting the drive circuit 10c and the transmission coil 10a. Namely, one of the two metal films disposed in opposite relation to each other is connected to the drive circuit 10c by means of the wire 10d, while the other metal film is connected to the transmission coil 10a. The aforementioned resin for building up is interposed between the two metal films. Accordingly, the metal film 10g functions as a capacitor having the capacitance C which is determined by the gap between the two films, the area, and the dielectric constant of the resin. It should be noted that the detection coil 10b is connected to the processing circuit 10e by means of the wire 10f without the medium of the metal film 10g.

Figure 3:
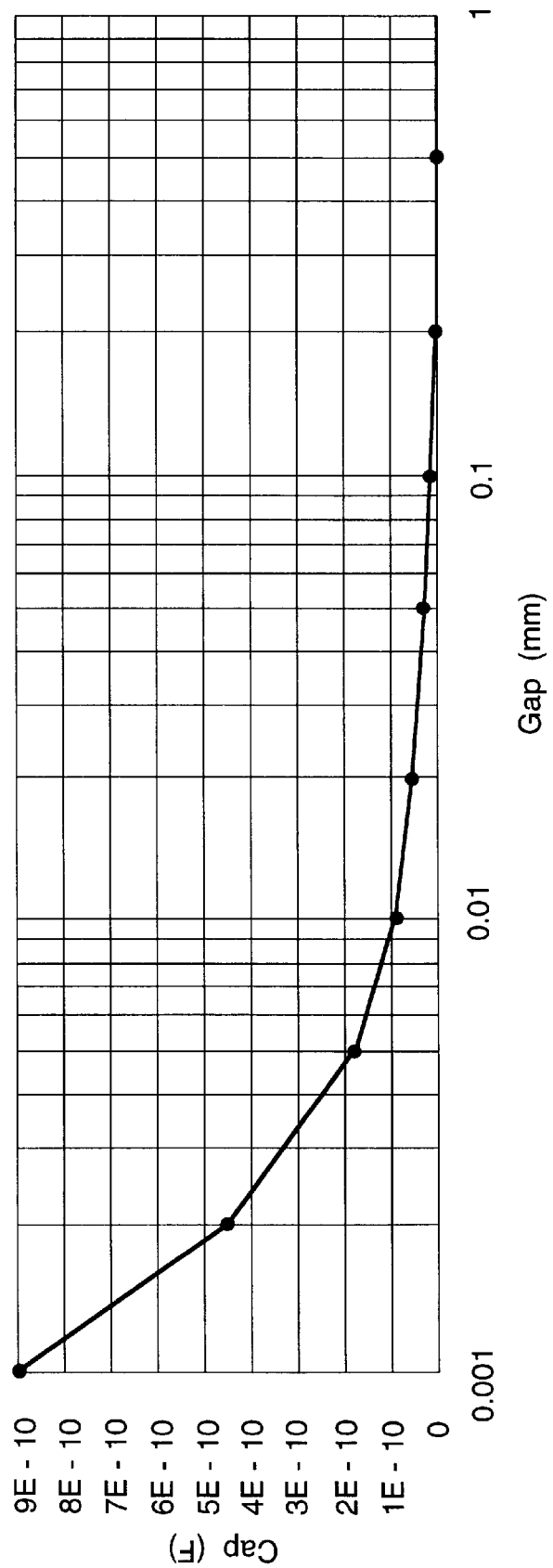
FIG. 3 is a graph illustrating the relationship between a gap between metal films and capacitance.

FIG. 3 shows the relationship between the gap between the two metal films and the capacitance in a case where the opposing area of the two metal films making up the metal film 10g (that is, the area of one metal film opposing the other metal film) is set to 10 mm×10 mm. It should be noted that it is assumed that the space between the two metal films is in a vacuum for the sake of calculation. The capacitance C necessary for realizing the LC resonance circuit is 0.1 nF or thereabouts. However, as can be appreciated from the drawing, even in the case of the area of 10 mm×10 mm, if the gap is set to 0.01 mm or thereabouts, it is possible to secure the necessary capacitance. It goes without saying that if an insulating resin is interposed between the two metal films as shown in FIG. 1, a larger gap makes it possible to secure the necessary capacitance.

Thus, in this embodiment, since a capacitor is formed between the transmission coil arid the drive circuit by making use of the multilayered structure, it is unnecessary to separately connect a chip capacitor, thereby making it possible to make the detection unit compact.

It should be noted that although in this embodiment the capacitor is formed by disposing two metal films in opposite relation, the metal films may be formed of a magnetic material such as permalloy. In that case, it is possible to increase the magnetic flux density produced from the transmission coil, and generate an induced current in the scale coil on the scale 12 more efficiently.

In addition, although in this embodiment the capacitor is formed by disposing two metal films in opposite relation, a single metal film may be used and disposed in the vicinity of the transmission coil 10a to form a capacitor between the same and the transmission coil 10a.

Figure 4:
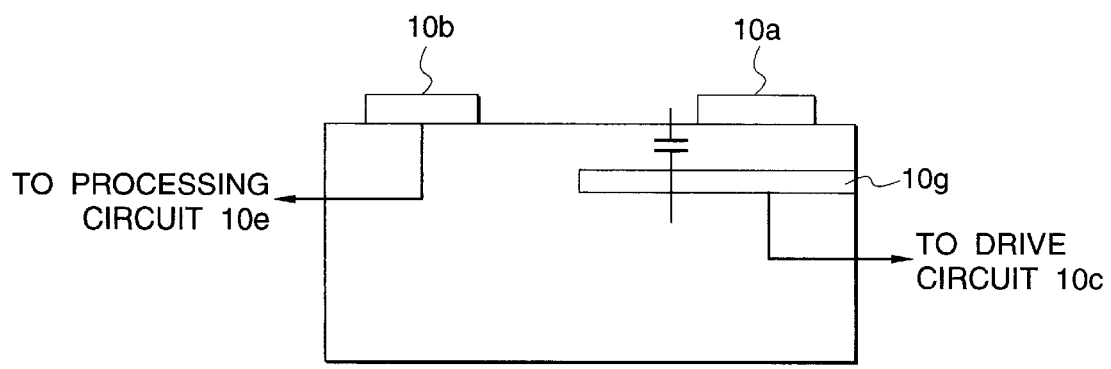
FIG. 4 is an explanatory diagram illustrating the relationship of connection between the metal film and the transmission coil according to with a second embodiment of the invention.

FIG. 4 shows an example of a case in which the metal film log is formed of a single metal film. The metal film 10g is disposed in the vicinity of the transmission coil 10a, e.g., about 0.01 mm immediately below the transmission coil 10a, and is connected to the drive circuit 10c by means of the wire 10d. Stray capacitance is formed between the transmission coil 10a and the metal film 10g, and can be used as the capacitance C of the LC resonance circuit. In this embodiment as well, if the metal film 10g is formed of a magnetic material such as permalloy, not only does this arrangement function as a capacitor, but it becomes possible to increase the magnetic flux of the transmission coil 10a.

Figure 5:
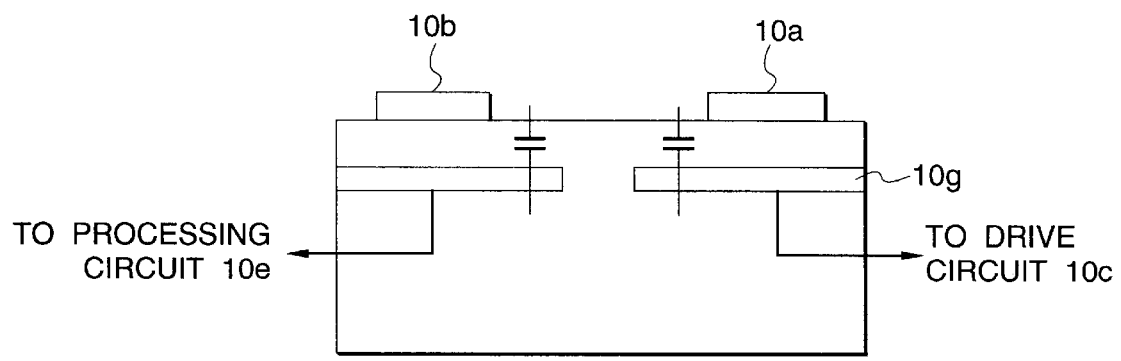
FIG. 5 is an explanatory diagram illustrating the relationship of connection among the metal film, the transmission coil, and a detection coil according to a third embodiment of the invention.

Further, as shown in FIG. 5, the metal film 10g may be provided in the vicinity of the detection coil 10b as well, and the metal film 10g may be connected to the processing circuit by means of the wire 10f, so as to form stray capacitance on the detection coil side. This stray capacitance and the inductance L of the detection coil is coupled to each other, and the opposing area of the detection coil 10b and the metal film 10g is adjusted to allow the resonance frequency on the transmission coil side and the resonance frequency on the detection coil side to match, thereby making it possible to increase the signal detection sensitivity. In this embodiment as well, the metal film 10g is preferably formed of a magnetic material.

As described above, although a description has been given of the embodiment of the invention by citing as an example the induction-type encoder having the transmission coil and the detection coil, the invention is also applicable to other encoders or transducers requiring the LC resonance circuit.

In accordance with the invention, a chip capacitor is made unnecessary, so that the unit can be miniaturized. In addition, the thickness of the chip capacitor is made unnecessary, so that the gap of the scale can be made small, there by making it possible to improve the detection sensitivity. Furthermore, since the chip capacitor is made unnecessary, the number of component parts is reduced, so that the cost declines.

What is claimed is:

1. A relative-displacement detecting unit for detecting a relative displacement of said relative-displacement detecting unit and a scale opposing said relative-displacement detecting unit, and for outputting it as an electrical signal, said unit comprising:

a substrate;

a transmitting section formed on said substrate and driven by a drive circuit; and a first metal film formed between said substrate and said transmitting section so as to form a capacitor connected between said transmitting section and the drive circuit.

2. The relative-displacement detecting unit according to claim 1, wherein said first metal film is a magnetic film.

3. The relative-displacement detecting unit according to claim 1, wherein said first metal film is formed of two metal films disposed in opposite relation to each other by being spaced apart a predetermined distance therebetween.

4. The relative-displacement detecting unit according to claim 3, wherein an insulating resin is disposed between the two metal films.

5. The relative-displacement detecting unit according to claim 1, wherein said first metal film is formed so as to be spaced apart a predetermined distance from said transmitting section, and the capacitor is formed between said first metal film and said transmitting section.

6. The relative-displacement detecting unit according to claim 1, comprising:

a detecting section formed on said substrate, for outputting a detection signal according to the relative displacement of said relative-displacement detecting unit and the scale to a processing circuit; and a second metal film formed between said substrate and said detecting section so as to form a capacitor connected between said detecting section and the processing circuit.

7. The relative-displacement detecting unit according to claim 6, wherein said second metal film is a magnetic film.

8. The relative-displacement detecting unit according to claim 6, wherein said second metal film is formed so as to be spaced apart a predetermined distance from said detecting section, and the capacitor is formed between said second metal film and said detecting section.

9. The relative-displacement detecting unit according to claim 1, wherein said relative-displacement detecting unit is one of a capacitance-type encoder, an induction-type encoder, a capacitance-type transducer, and an induction-type transducer.

* * * * *

UNITED STATES PATENT AND TRADEMARK OFFICE
CERTIFICATE OF CORRECTION

PATENT NO. : 6,486,796 B2
DATED : November 26, 2002
INVENTOR(S) : Toshiharu Miyata It is certified that error appears in the above-identified patent and that said Letters Patent is hereby corrected as shown below:

<u>Title page,</u>
Item [57], ABSTRACT,
Line 1, delete "detect ion" and insert -- detection --.

<u>Column 2,</u>
Line 15, delete "there by" and insert -- thereby --.
Line 19, delete "Leach" and insert -- each --.

<u>Column 3,</u>
Line 25, delete "log" and insert -- 10g --.

<u>Column 4,</u>
Line 9, delete "log" and insert -- 10g --.
Line 23, after "circuit", insert -- 10e --.

Signed and Sealed this

Twenty-ninth Day of April, 2003

JAMES E. ROGAN
*Director of the United States Patent and Trademark Office*